(12) United States Patent (10) Patent No.: US 8,732,592 B2
Nielsen et al. (45) Date of Patent: May 20, 2014

(54) METHODS AND SYSTEMS RELATING TO AN AUGMENTED VIRTUALITY ENVIRONMENT

(75) Inventors: Curtis W. Nielsen, Rexburg, ID (US); Matthew O. Anderson, Idaho Falls, ID (US); Mark D. McKay, Idaho Falls, ID (US); Derek C. Wadsworth, Rexburg, ID (US); Jodie R. Boyce, Rigby, ID (US); Ryan C. Hruska, Idaho Falls, ID (US); John A. Koudelka, Idaho Falls, ID (US); Jonathon Whetten, Provo, UT (US); David J. Bruemmer, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 383 days.

(21) Appl. No.: 12/480,459

(22) Filed: Jun. 8, 2009

(65) Prior Publication Data

US 2010/0313146 A1 Dec. 9, 2010

(51) Int. Cl.
*G06F 3/04815* (2013.01)
(52) U.S. Cl.
USPC ... 715/757; 340/521; 340/995.1; 340/995.19; 382/104; 382/103
(58) Field of Classification Search
USPC .......................................................... 715/757
See application file for complete search history.

(56) References Cited

U.S. PATENT DOCUMENTS

| | | | | | |
|---|---|---|---|---|---|
| 5,161,886 | A | * | 11/1992 | De Jong et al. | 701/458 |
| 5,259,037 | A | * | 11/1993 | Plunk | 382/154 |
| 5,945,926 | A | * | 8/1999 | Ammar et al. | 340/970 |
| 6,037,914 | A | * | 3/2000 | Robinson | 345/7 |
| 6,064,749 | A | * | 5/2000 | Hirota et al. | 382/103 |
| 6,175,343 | B1 | * | 1/2001 | Mitchell et al. | 345/8 |
| 6,208,933 | B1 | * | 3/2001 | Lazar | 701/409 |
| 6,289,277 | B1 | * | 9/2001 | Feyereisen et al. | 701/528 |
| 6,411,266 | B1 | * | 6/2002 | Maguire, Jr. | 345/8 |
| 6,500,008 | B1 | * | 12/2002 | Ebersole et al. | 434/226 |
| 6,734,896 | B2 | * | 5/2004 | Nobori et al. | 348/148 |
| 6,919,867 | B2 | * | 7/2005 | Sauer | 345/8 |
| 7,148,861 | B2 | * | 12/2006 | Yelton et al. | 345/8 |
| 7,161,616 | B1 | * | 1/2007 | Okamoto et al. | 348/148 |
| 7,162,054 | B2 | * | 1/2007 | Meisner et al. | 382/103 |

(Continued)

OTHER PUBLICATIONS

Tsuyoshi et al., "Teleoperation of Multiple Robots through the internet", Robot and Human Communication, 1996., 5th IEEE, pp. 84-89, Nov. 14, 1996.*

(Continued)

*Primary Examiner* — William Bashore
*Assistant Examiner* — Reza Nabi
(74) *Attorney, Agent, or Firm* — TraskBritt

(57) ABSTRACT

Systems and methods relating to an augmented virtuality system are disclosed. A method of operating an augmented virtuality system may comprise displaying imagery of a real-world environment in an operating picture. The method may further include displaying a plurality of virtual icons in the operating picture representing at least some assets of a plurality of assets positioned in the real-world environment. Additionally, the method may include displaying at least one virtual item in the operating picture representing data sensed by one or more of the assets of the plurality of assets and remotely controlling at least one asset of the plurality of assets by interacting with a virtual icon associated with the at least one asset.

34 Claims, 12 Drawing Sheets

(56) References Cited

U.S. PATENT DOCUMENTS

| | | | |
|---|---|---|---|
| 7,228,230 B2* | 6/2007 | Hirokawa | 701/472 |
| 7,274,380 B2* | 9/2007 | Navab et al. | 345/633 |
| 7,301,547 B2* | 11/2007 | Martins et al. | 345/633 |
| 7,343,232 B2* | 3/2008 | Duggan et al. | 701/24 |
| 7,480,566 B2* | 1/2009 | Laverty | 701/426 |
| 7,502,688 B2* | 3/2009 | Hirokawa | 701/480 |
| 7,583,275 B2* | 9/2009 | Neumann et al. | 345/633 |
| 7,693,702 B1* | 4/2010 | Kerner et al. | 703/22 |
| 7,920,071 B2* | 4/2011 | Baillot | 340/937 |
| 7,925,391 B2* | 4/2011 | Sanders-Reed | 701/3 |
| 8,400,507 B2* | 3/2013 | Grigsby et al. | 348/149 |
| 2003/0165255 A1* | 9/2003 | Yanagawa et al. | 382/104 |
| 2003/0210832 A1* | 11/2003 | Benton | 382/284 |
| 2004/0028258 A1* | 2/2004 | Naimark et al. | 382/103 |
| 2004/0104935 A1* | 6/2004 | Williamson et al. | 345/757 |
| 2004/0105573 A1* | 6/2004 | Neumann et al. | 382/103 |
| 2004/0119662 A1* | 6/2004 | Dempski | 345/8 |
| 2004/0263514 A1* | 12/2004 | Jin et al. | 345/440 |
| 2005/0031169 A1* | 2/2005 | Shulman et al. | 382/104 |
| 2005/0195096 A1* | 9/2005 | Ward et al. | 340/995.14 |
| 2007/0016372 A1* | 1/2007 | Browne et al. | 701/213 |
| 2007/0106434 A1* | 5/2007 | Galbraith et al. | 701/19 |
| 2007/0124382 A1 | 5/2007 | Hughes | |
| 2007/0273557 A1* | 11/2007 | Baillot | 340/988 |
| 2008/0009969 A1* | 1/2008 | Bruemmer et al. | 700/245 |
| 2008/0147325 A1* | 6/2008 | Maassel et al. | 702/5 |
| 2008/0218331 A1* | 9/2008 | Baillot | 340/521 |
| 2008/0221745 A1* | 9/2008 | Diamandis et al. | 701/3 |
| 2008/0266324 A1* | 10/2008 | Lynch et al. | 345/634 |
| 2009/0073034 A1* | 3/2009 | Lin | 342/357.07 |
| 2010/0292874 A1* | 11/2010 | Duggan et al. | 701/11 |
| 2010/0313146 A1* | 12/2010 | Nielsen et al. | 715/757 |

OTHER PUBLICATIONS

MediaMapper by Red Hens Systems, the multimedia map creator, published on Jan. 24, 2002, pp. 1-12.*

Ahuja et al., "Layered Augmented Virtuality," 13th IASTED International Conference on Robotics & Applications, Wurzburg, Germany, Aug. 29-31, 2007, 6 pages.

Harbour et al., "Enabling Technologies for Unmanned Protection Systems," SPIE Proc. 5804: Unmanned Ground Vehicle Technology VII, Orlando, FL, Mar. 29-31, 2005, 8 pages.

Nielsen et al., "Intelligent Autonomy for Unmanned Air & Ground Vehicles," Idaho National Laboratory (INL), Idaho Falls, Idaho, Nov. 17, 2008, 96 pages.

Nielsen et al., "Using mixed-initiative interactions to mitigate variance in search behavior with a mobile robot," Idaho National Laboratory (INL), Idaho Falls, Idaho, Dec. 16, 2008, 6 pages.

Pacis et al., "Transitioning Unmanned Ground Vehicle Research Technologies," SPIE Proc. 5804: Unmanned Ground Vehicle Technology VII, Orlando, FL, Mar. 29-31, 2005, 11 pages.

* cited by examiner

METHODS AND SYSTEMS RELATING TO AN AUGMENTED VIRTUALITY ENVIRONMENT

GOVERNMENT RIGHTS

This invention was made with government support under Contract Number DE-AC07-05ID14517 awarded by the United States Department of Energy. The government has certain rights in the invention.

TECHNICAL FIELD

Embodiments of the present invention are directed generally to augmented virtuality and, more specifically, to systems and methods relating to an augmented virtuality environment system configured to provide three-dimensional visualization and control of a plurality of assets positioned within a real-world environment.

BACKGROUND

In various applications, such as military operations or computer games, there is a need to insert real information into a virtual world environment in real-time. One technique for providing this feature may be referred to as "augmented virtuality." Augmented virtuality is an environment that includes a combination of real-world and computer-generated data and allows a person to see or otherwise sense a computer-generated virtual world integrated with the real-world. Display systems that provide this feature are often referred to as "augmented virtuality systems." Augmented virtuality systems may enhance real-world images with computer-generated elements that help users identify or interpret the real-world information. For example, a computer may generate a real-world image of a town including virtual labels identifying specific streets and buildings within the image. In another aspect, augmented virtuality systems may allow otherwise hidden information to be visualized in the context of the real-world. A simple example would be displaying a virtual representation of underground electrical conduits overlaid on real-world images of a city street.

Augmented virtuality systems may be adapted to support military command, control, navigation, surveillance and reconnaissance systems, as well as other applications, such as emergency response, law enforcement, and homeland defense. Conventional augmented virtuality systems display assets (e.g., unmanned ground vehicles, unmanned air vehicles, and unattended ground sensors) within an operating environment and information pertaining to those assets in a multitude of distinct windows or screens in a display device. For example, a first asset, such as an unmanned ground vehicle, and any information related to the first asset would be displayed in a first window or screen and a second asset, such as an unmanned air vehicle, and any related information would be displayed in a second window or screen. As a result, it may be difficult for an operator to understand how the information from each distinct window or screen relates to one another. Consequently, the operator may lack sufficient knowledge of the operating environment and, therefore, may be unable to make a complete and accurate situational assessment in order to complete a desired mission. Furthermore, in conventional augmented virtuality systems, an operator may be able to view, but not control, multiple assets within an operating environment.

There is a need to increase an operator's situational awareness of an operating environment. Specifically, there is a need for systems and methods for providing an operator with a capability for multi-perspective three-dimensional visualization and control of multiple assets within an operating environment displayed in a common operating picture.

BRIEF SUMMARY OF THE INVENTION

An embodiment of the present invention comprises a method of operating an augmented virtuality system. The method may comprise displaying imagery of a real-world environment in an operating picture. The method may further include displaying a plurality of virtual icons in the operating picture representing at least some assets of a plurality of assets positioned in the real-world environment. Additionally, the method may include displaying at least one virtual item in the operating picture representing data sensed by one or more of the assets of the plurality of assets. The method may also include remotely controlling at least one asset of the plurality of assets by interacting with a virtual icon associated with the at least one asset.

Another embodiment of the present invention includes a method of operating an augmented virtuality system. The method includes displaying imagery of a real-world environment and virtual data in an operating picture, wherein at least some of the virtual data represents a plurality of assets positioned in the real-world environment. The method further includes navigating at least one asset of the plurality of assets positioned within the real-world environment.

Another embodiment of the present invention includes an augmented virtuality system. The system includes a plurality of assets positioned within a real-world environment and at least one computer communicatively coupled to each asset of the plurality. The computer includes a processor and a computer-readable medium coupled to the processor. The system also includes a display device operably coupled to the computer and an application program stored in the computer-readable medium. When executed by the processor, the application program is configured to operate an augmented virtuality system according to an embodiment of the invention.

Another embodiment of the present invention includes a computer-readable media storage medium storing instructions that, when executed by a processor, cause the processor to perform instructions for operating an augmented virtuality system according to an embodiment of the invention.

Yet another embodiment of the present invention includes a method of generating an augmented virtuality environment. The method comprises displaying real-world imagery of a real-world environment in an operating picture. The method also includes displaying at least one virtual icon in the operating picture, wherein the at least one virtual icon represents an asset of a plurality of assets positioned in the real-world environment. The method further includes displaying virtual data in the operating picture representing data sensed by at least two assets of the plurality of assets.

BRIEF DESCRIPTION OF THE DRAWINGS

FIGS. 5A and 5B illustrate screenshots of at least a portion of an operating picture including satellite imagery, local aerial imagery, and virtual representations of assets positioned within a real-world environment, in accordance with an embodiment of the present invention;

DETAILED DESCRIPTION OF THE INVENTION

Figure 1:
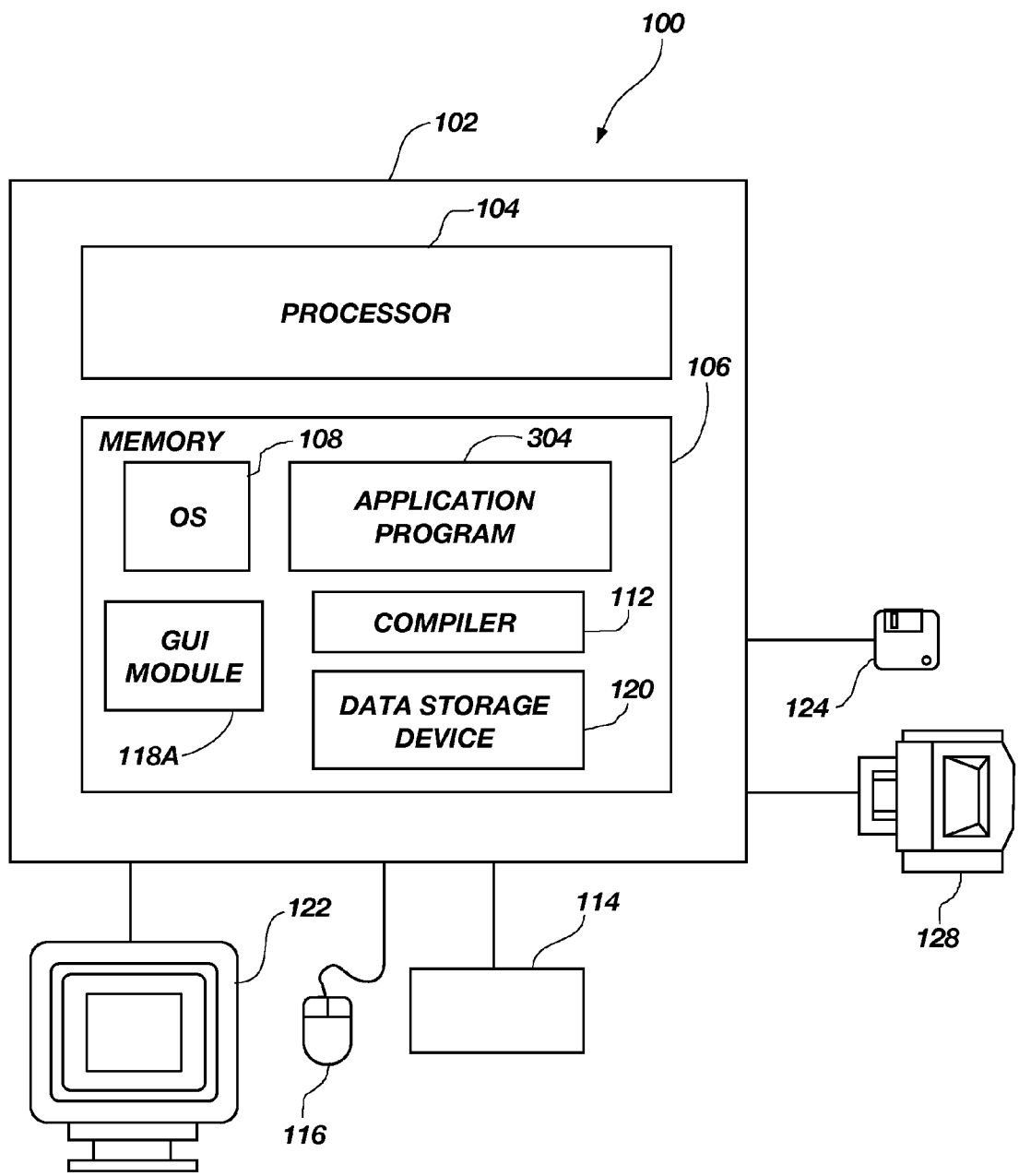
FIG. 1 is a block diagram of a computer system, according to an embodiment of the present invention.

In the following detailed description, reference is made to the accompanying drawings which form a part hereof and, in which is shown by way of illustration, specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the disclosure.

In this description, functions may be shown in block diagram form in order not to obscure the present invention in unnecessary detail. Furthermore, specific implementations shown and described are only examples and should not be construed as the only way to implement the present invention unless specified otherwise herein. Block definitions and partitioning of logic between various blocks represent a specific, non-limiting implementation. It will be readily apparent to one of ordinary skill in the art that the various embodiments of the present invention may be practiced by numerous other partitioning solutions. For the most part, details concerning timing considerations, and the like, have been omitted where such details are not necessary to obtain a complete understanding of the present invention in its various embodiments and are within the abilities of persons of ordinary skill in the relevant art.

Referring in general to the following description and accompanying drawings, various aspects of the present invention are illustrated to show its structure and method of operation. Common elements of the illustrated embodiments are designated with like numerals. It should be understood that the figures presented are not meant to be illustrative of actual views of any particular portion of the actual structure or method, but are merely idealized representations which are employed to more clearly and fully depict the present invention.

As described more fully below, various embodiments of the present invention relate to an augmented virtuality system including an operator control unit. The operator control unit may comprise a plurality of assets positioned within a real-world environment and an operator control interface. The operator control interface may be configured to display three-dimensional (3-D) virtual representations of the plurality of assets in an augmented virtuality environment displayed in a common operating picture. The operator control interface may also be configured to fuse heterogeneous sensor data obtained from the plurality of assets into the augmented virtuality environment and display 3-D virtual representations of the heterogeneous sensor data within the common operating picture. Accordingly, the operator control interface may be configured to provide a holistic representation of the real-world environment and, therefore, an operator may visualize the spatial relationships between each of the assets, any sensor data gathered by the assets, and any other objects within the real-world environment. As a result, the augmented virtuality system may increase an operator's situational awareness of the real-world environment and, thus, may enhance the operator's mission planning abilities. Additionally, the operator control unit may be configured to provide for gradient levels of control of each asset positioned within a real-world environment and, therefore, the augmented virtuality system may increase an operator's ability to carry out a planned mission.

FIG. 1 illustrates a computer system 100 that may be used to implement various embodiments of the present invention. Computer system 100 may include a computer 102 comprising a processor 104 and a memory 106, such as random access memory (RAM). For example only, and not by way of limitation, computer 102 may comprise a workstation, a laptop, a hand-held device, such as a cell phone or a personal digital assistant (PDA), or any other processor-based device known in the art. Computer 102 may be operably coupled to a display 122 configured to display data, images, video, or any other displayable information.

Generally, computer 102 may operate under control of an operating system 108 stored in memory 106, and may interface with a user to accept inputs and commands and to present outputs through a graphical user interface (GUI) module 118A. Although GUI module 118A is depicted as a separate module, the instructions performing the GUI functions may be resident or distributed in the operating system 108, an application program 304, or implemented with special purpose memory and processors. Computer 102 may also implement a compiler 112 that allows an application program 304 written in a programming language to be translated into processor 104 readable code. Application program 304 may be configured to access and manipulate data stored in memory 106 of computer 102 using relationships and logic that are generated using compiler 112.

In various embodiments of the present invention, instructions implementing the operating system 108, application program 304, and compiler 112 may be tangibly embodied in a computer-readable medium (e.g., data storage device 120), which may include one or more fixed or removable data storage devices, such as a zip drive, floppy disc drive 124, hard drive, CD-ROM drive, tape drive, flash memory device, etc. Although data storage device 120 is shown as part of computer 102, it may be located externally. For instance, data storage device 120 may be configured as network accessible storage located remotely from computer 102.

Further, operating system 108 and application program 304 may include instructions that, when read and executed by computer 102, may cause computer 102 to perform the steps necessary to implement and/or use embodiments of the present invention. Application program 304 and/or operating instructions may also be tangibly embodied in memory 106 and/or data communications devices, thereby making a computer program product or article of manufacture according to an embodiment the present invention. As such, the term "application program" as used herein is intended to encompass a computer program accessible from any computer readable device or media. Furthermore, portions of application program 304 may be distributed such that some of the application program 304 may be included on a computer readable media within computer 102 and some of application program 304 may be included in a remote device, such as in an asset 204 (see FIG. 2) within a real-world environment 202, as described more fully below. Computer 102 may be operably coupled to other devices, such as a keyboard 114, a mouse 116, a printer 128, etc.

Figure 2:
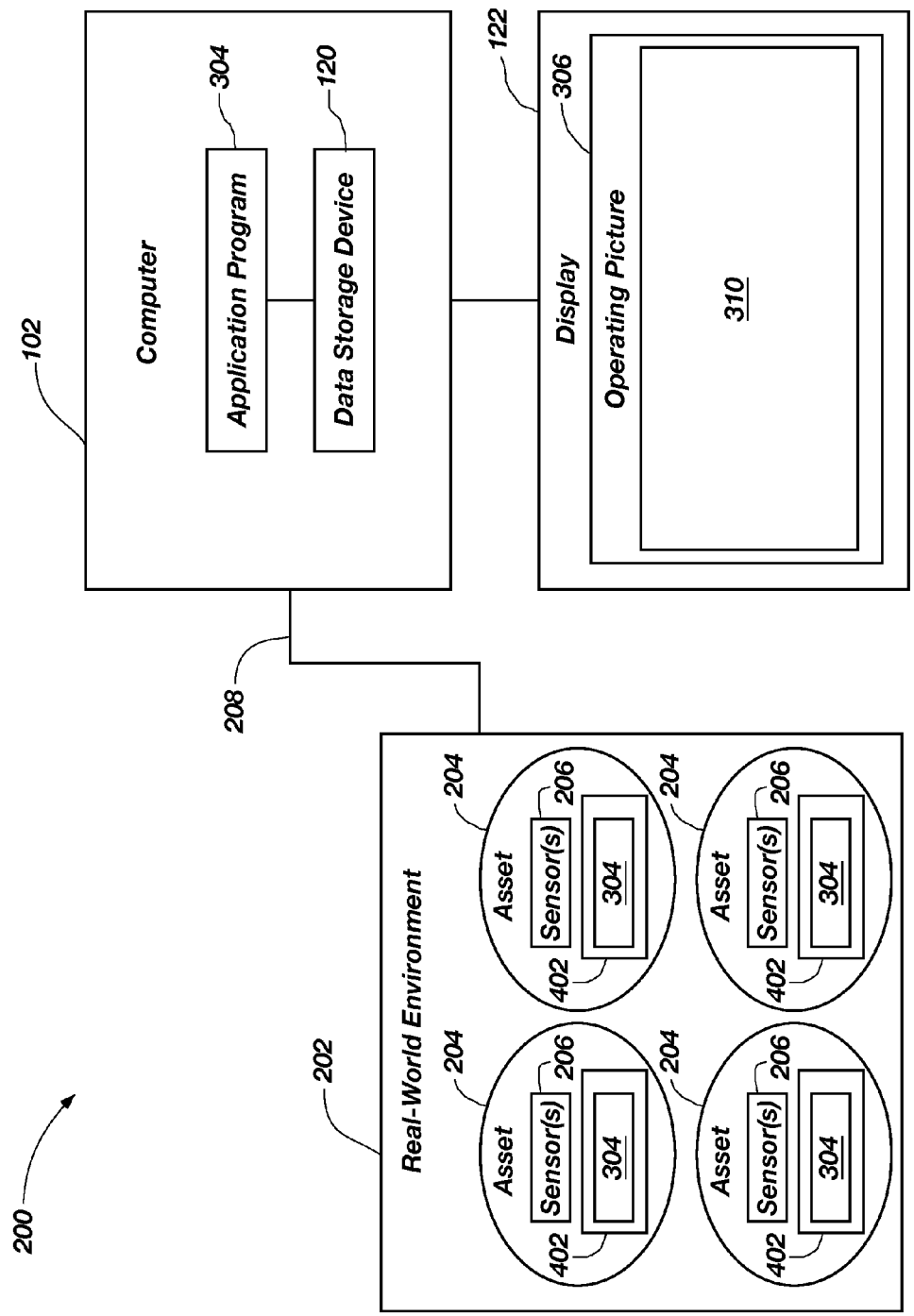
FIG. 2 is a block diagram of an augmented virtuality system, in accordance with an embodiment of the present invention.

FIG. 2 is a block diagram illustrating an augmented virtuality system 200 including a real-world environment 202, computer 102, and display 122. Real-world environment 202 may include one or more assets 204 configured to navigate within real-world environment 202. Although FIG. 2 depicts real-world environment 202 including four assets 204, real-world environment 202 may include any number of assets 204. Assets 204 may be positioned in any location within real-world environment 202 and may include, for example only, unmanned ground vehicles (UGVs), unmanned surface vehicles (USVs), unmanned air vehicles (UAVs), unattended ground sensors (UGSs), and personnel. Each asset 204 within real-world environment 202 may include one or more sensors 206 operably coupled thereto. Each sensor 206 may be configured for sensing information about conditions within real-world environment 202. Examples of such sensors 206 include image sensors, tracking sensors, range sensors, temperature sensors, radiation sensors, smoke detectors, gas sensors, wind sensors, pressure sensors, humidity sensors, infrared sensors, counter-mine sensors, explosive sensors, position sensors, lasers, sonar devices, and the like.

Additionally, each asset 204 may include a dedicated computer 402 including data storage device (not shown) having a portion of application program 304 stored therein. As such, sensor data gathered by sensor 206 may be stored locally in associated computer 402. Computer 102 may be configured to communicate with each asset 204 via wireless communication medium 208. More specifically, each asset 204 may be configured to transmit data (e.g., images, video, and/or information) obtained from an associated sensor 206 to computer 102 over wireless communication medium 208. Furthermore, computer 102 may be configured to transmit control signals to each asset 204 over wireless communication medium 208.

Display 122 may be operably coupled to computer 102 and may be configured to display an augmented virtuality environment 310 in an operating picture 306, in accordance with an embodiment of the present invention. By way of example, and not limitation, display 122 may comprise a video wall (i.e., multiple computer monitors tiled together contiguously, in order to form one large screen), a hand-held device, a television monitor, a computer monitor, or any other monitor known in the art. Additionally, for example only, display 122 may comprise a holographic video display, such as a "Mark III" designed by Massachusetts Institute of Technology. Furthermore, display 122 may comprise a touch screen device having multi-touch interactive capabilities to allow an operator to directly interact with operating picture 306 in order to communicate a command to computer 102. Accordingly, for example only, display 122 may comprise a 3-D video table, such as a TOUCHTABLE™ sold by TouchTable Inc. of Pasadena, Calif. Computer system 100 (see FIG. 1) may also include peripheral I/O devices such as a keyboard, a mouse, joystick, stylus, or any for device configured for communicating an operator command to computer 102.

Figure 3:
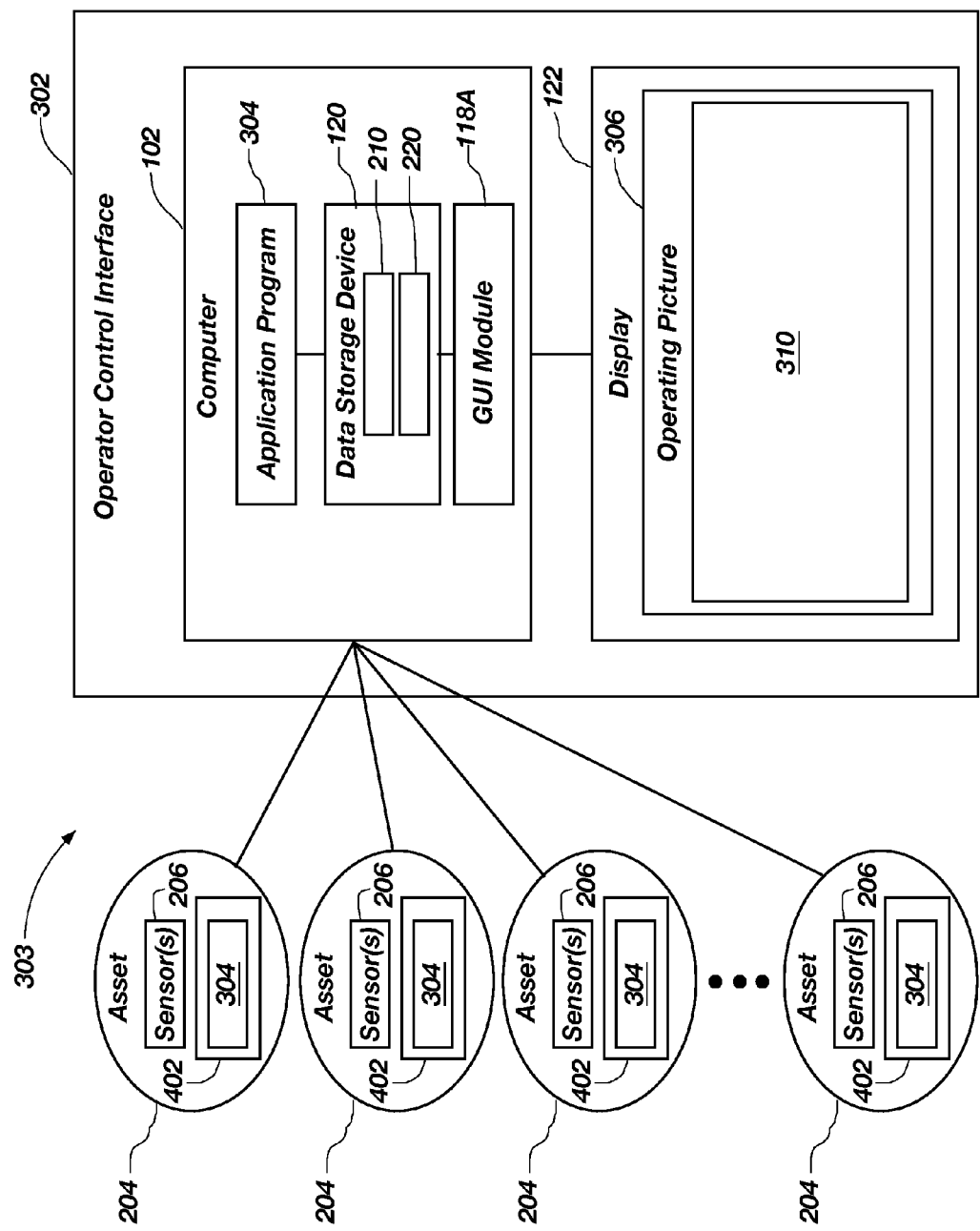
FIG. 3 is a block diagram of an operator control unit including a plurality of assets and an operator control interface, according to an embodiment of the present invention.

FIG. 3 illustrates an operator control unit 303 including assets 204 and an operator control interface 302. Operator control interface 302 includes application program 304, sensor data storage 210, geospatial data 220, GUI module 118A, and display 122. Sensor data storage 210 may include data (e.g., video, imagery and/or information) obtained from sensor 206 along with metadata describing, for example, the position data of the sensor 206, as well as the time the data was captured by sensor 206. Position data may include information, such as a latitude, a longitude, an altitude, and an orientation (i.e., point of view) of sensor 206. For example only, sensor data storage 210 may comprise imagery captured by an image sensor and tagged with position and time data provided by an associated global positioning system (GPS) sensor. As another example, sensor data storage 210 may include a temperature reading detected by a temperature sensor and tagged with position and time data provided by an associated GPS sensor. In another example, sensor data storage 210 may include commercially available a priori 3-D imagery (e.g., GOOGLE EARTH™ imagery) captured by one or more aerial satellites. In addition to receiving and storing sensor data gathered from sensor 206, operator control interface 302 may be configured to, as described more fully below, substantially simultaneously display virtual representations of the sensor data within augmented virtuality environment 310. Additionally, sensor data may be transmitted to any remote computer (not shown) via any wireless or wired communication medium, or any combination thereof.

Geospatial data 220 may include virtual items with associated predefined geospatial position data indicating a real-world location and/or geometry of each virtual item. Geospatial data 220 may include alphanumeric text, icons, pictures, symbols, shapes, lines, and/or three-dimensional geometries. Geospatial data 220 may also include two-dimensional or three-dimensional virtual objects, such as buildings, electrical power lines, streets, foliage, and clouds. As will be appreciated by one having ordinary skill in the art, geospatial data 220 may include data obtained from a source such as, for example, an external geospatial information system (a.k.a. "GIS") or an existing database containing location-based information. The geospatial data may be displayed in augmented virtuality environment 310 as one or more virtual items at appropriate locations representative of the existence of real-world items in real-world environment 202.

Figure 4:
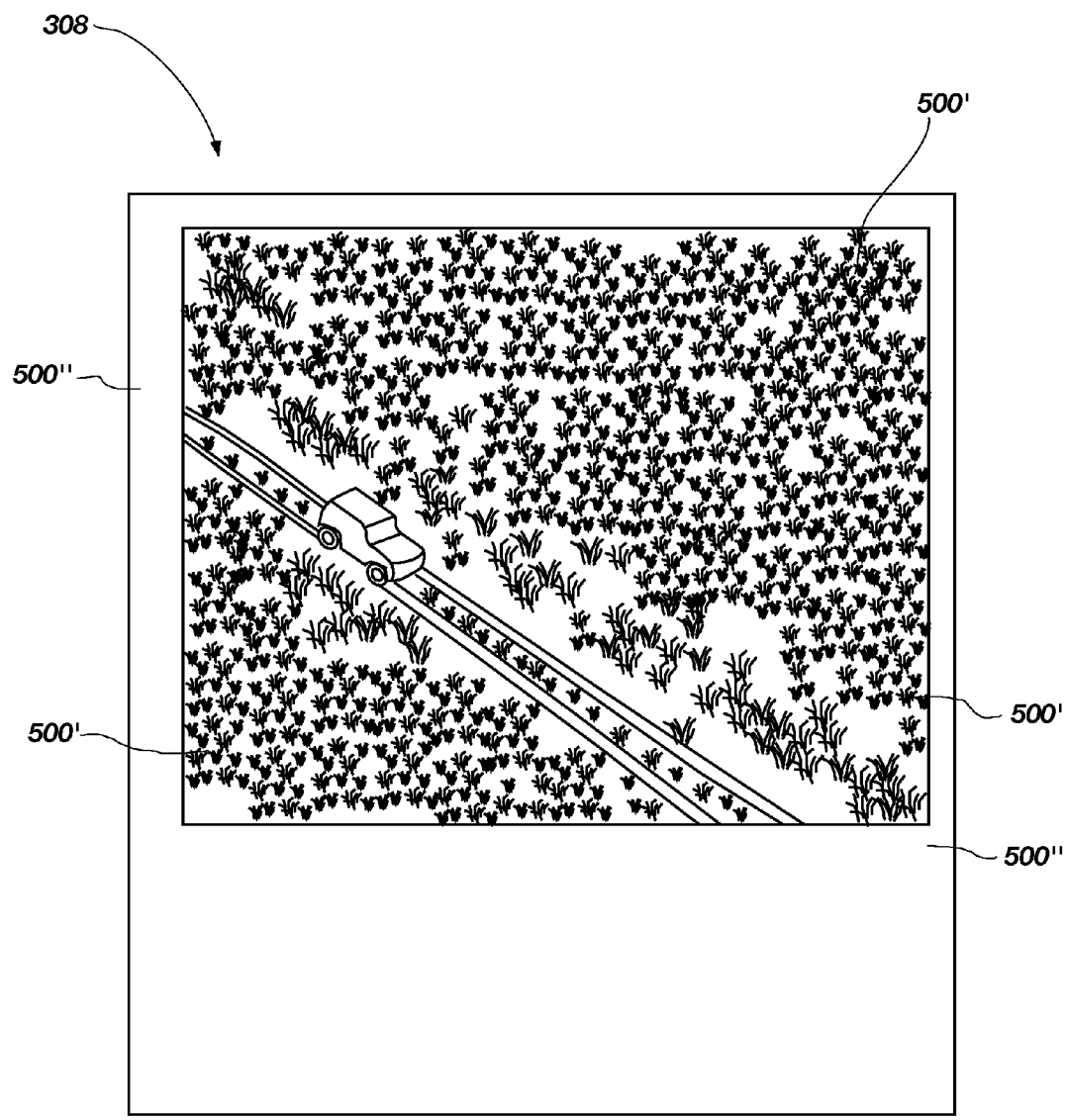
FIG. 4 illustrates a screenshot of at least a portion of an operating picture including satellite imagery and local aerial imagery, in accordance with an embodiment of the present invention.
Figure 5B:
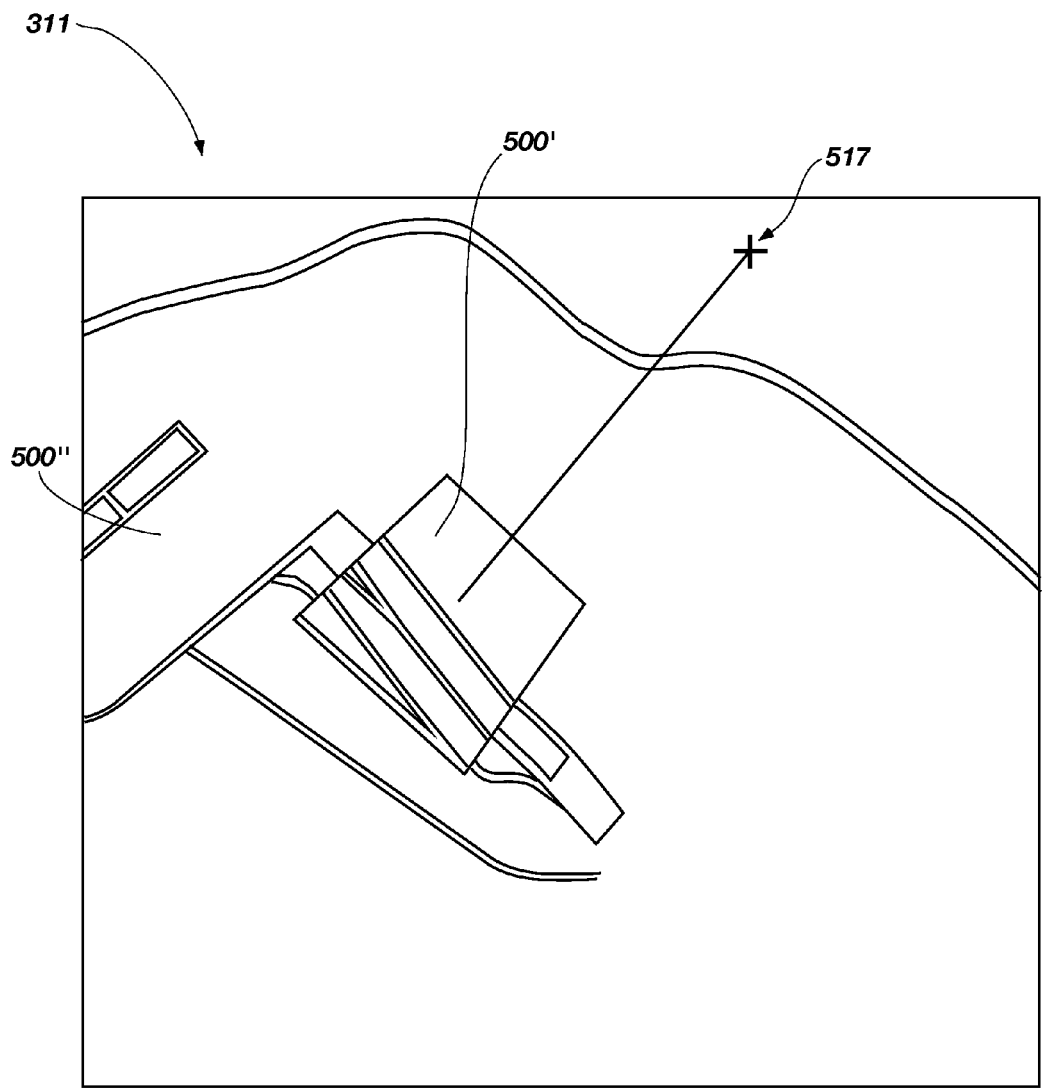

Operator control interface 302 may be configured to display real-world imagery within operating picture 306. More specifically, operator control interface 302 may be configured to display real-world base imagery (i.e., satellite imagery) and/or real-world local aerial imagery (i.e., live video and/or still images) in operating picture 306. The local aerial imagery may be obtained from one or more image sensors coupled to airplanes, UAVs, or any other aircraft within real-world environment 202 (see FIG. 2). FIG. 4 illustrates a screenshot 308 of a least a portion of operating picture 306. As illustrated in FIG. 4, local aerial imagery 500' may be mapped over at least a portion of base imagery 500" to display a dynamic real-time image of at least a portion of real-world environment 202 within operating picture 306. As described more fully below, operator control interface 302 may also be configured to display virtual data in operating picture 306. The virtual data may include virtual items representing assets 204, geospatial data, or any data related to or sensed by assets 204 (i.e., sensor data). Furthermore, operator control interface 302 may be configured to map the virtual data over the base and/or local aerial imagery to create an augmented virtuality environment 310 in operating picture 306. FIGS. 5A and 5B respectively illustrate screenshots 309 and 311 of at least a portion of operating picture 306. As illustrated in FIGS. 5A and 5B, virtual icons 516, which may represent ground vehicles, and virtual icon 517, which may represent an air vehicle within real-world environment 202, may be mapped over local aerial imagery 500' and/or base imagery 500" to display augmented virtuality environment 310 in operating picture 306. Additionally, it should be noted that operator control interface 302 may be configured to map both the local aerial imagery over the base imagery and the virtual data over the base and/or the local aerial imagery in real-time.

Figure 6:
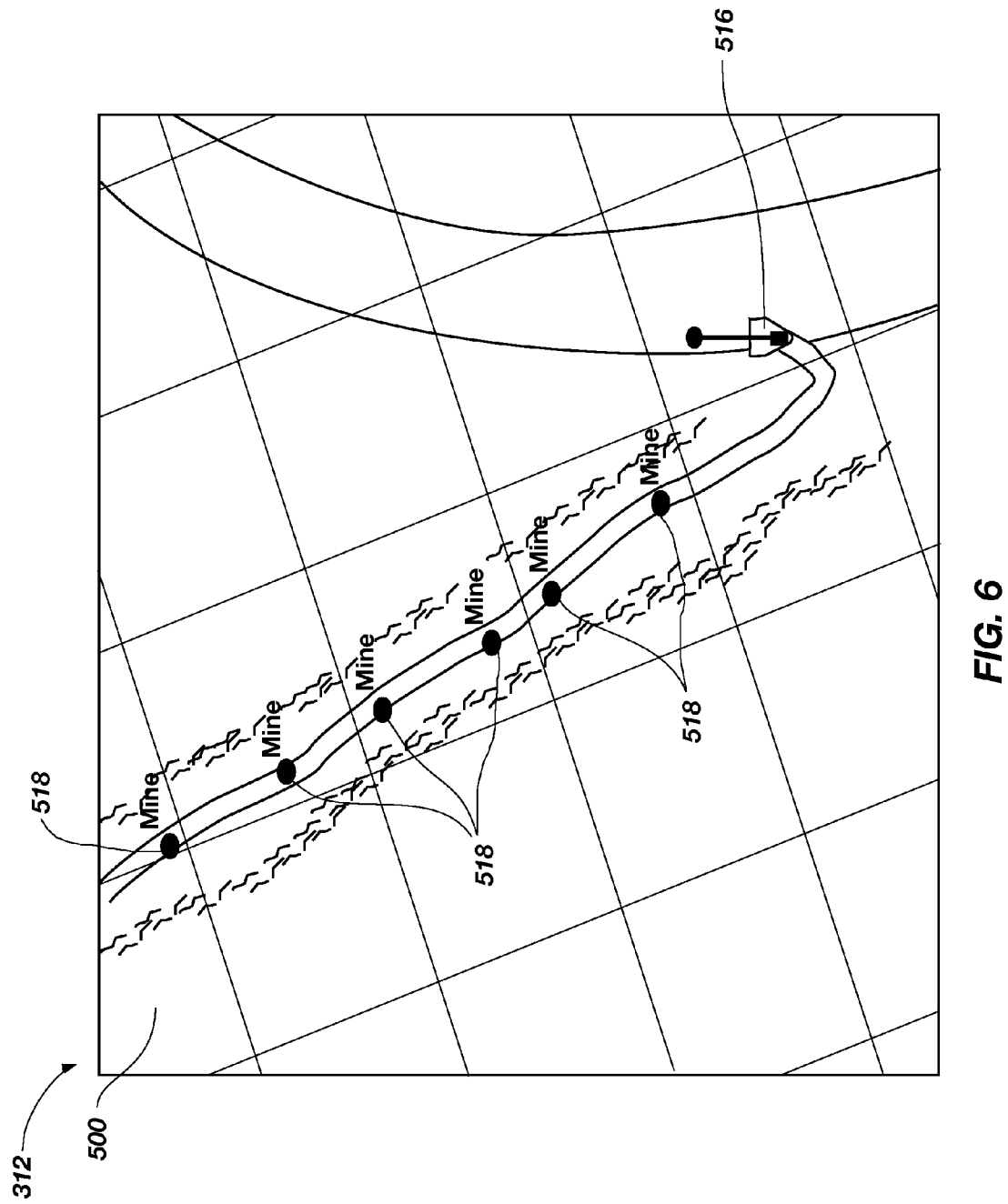
FIG. 6 illustrates a screenshot of at least a portion of an operating picture including virtual representations of an asset positioned within a real-world environment and sensor data sensed by the asset.

The sensor data may be displayed in augmented virtuality environment 310 as one or more virtual items, such as, for example only, imagery, video, alphanumeric text, colors, virtual icons, or virtual objects. For explanation purposes only, and not by way of limitation, various contemplated examples of how the sensor data may be displayed will now be discussed. For example only, the sensor data gathered from a radiation sensor, a chemical sensor, an explosive sensor, or a thermal sensor may be displayed as alphanumeric readings at an appropriate location within augmented virtuality environment 310. In addition to or in place of displaying an alphanumeric reading, the sensor data gathered from, for example only, a radiation sensor, an explosive sensor, or a chemical sensor may also be represented in augmented virtuality environment 310 by a virtual object. As an example, with reference to FIG. 6 which illustrates a screenshot 312 of at least a portion of operating picture 306, virtual objects 518 displayed in augmented virtual environment 310 may represent the existence of mines sensed by an asset (displayed as virtual icon 516) within real-world environment 202. It should be noted that virtual objects 518 are displayed at positions within augmented virtual environment 310 to represent the existence of mines at associated positions within real-world environment 202.

Figure 9:
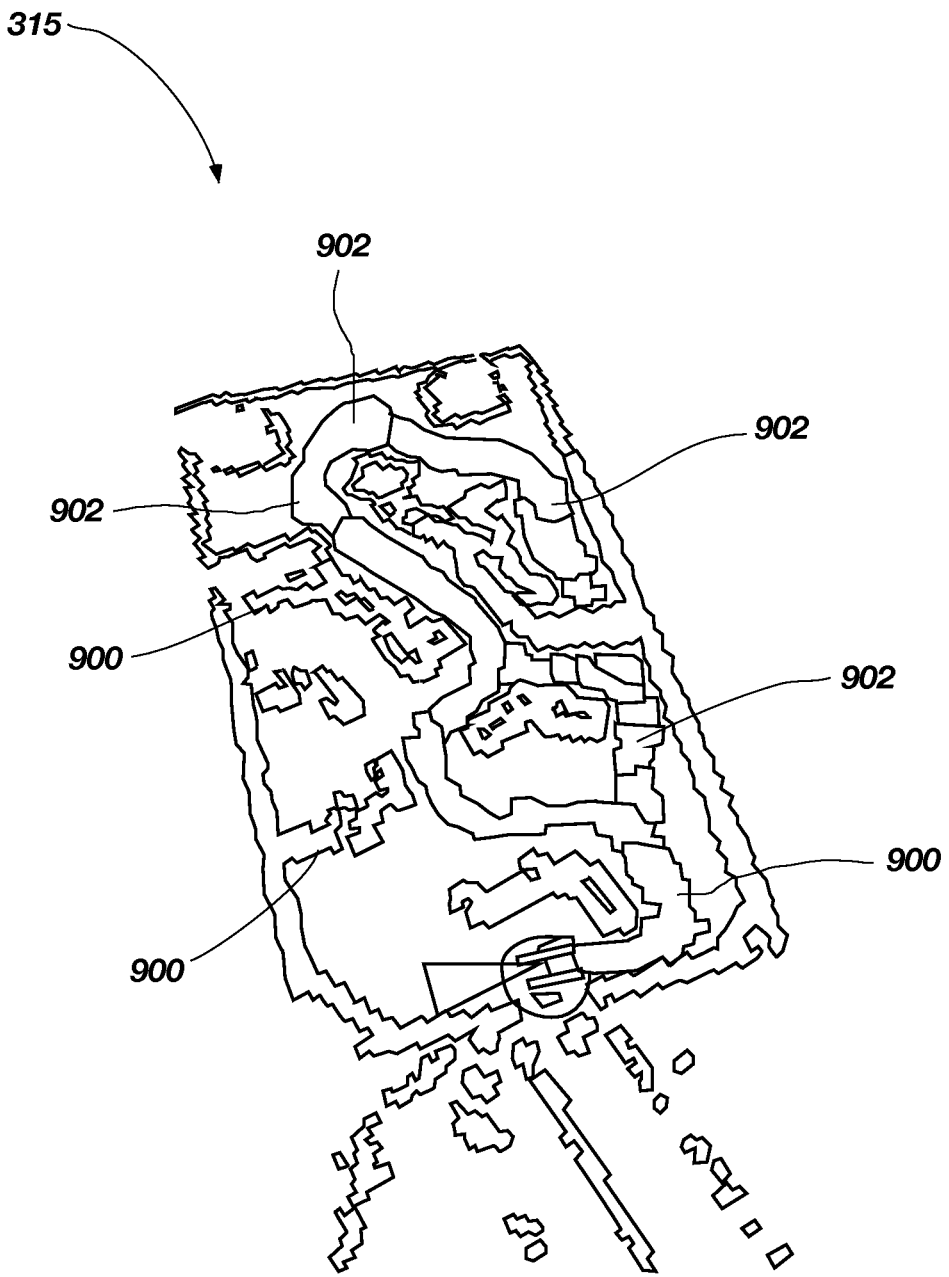
FIG. 9 illustrates a black and white rendering of a screenshot of at least a portion of an operating picture including virtual color-coded regions, in accordance with an embodiment of the present invention.

Moreover, as another example, in addition to or in place of the displaying alphanumeric readings from a thermal sensor, the sensor data gathered from a thermal sensor may also be displayed virtually as a color (e.g., blue for "cold" or red for "hot") at an appropriate location within augmented virtuality environment 310 to represent a temperature condition at an associated position in real-world environment 202. FIG. 9 illustrates a black and white rendering of a screenshot 315 of at least a portion of operating picture 306 including virtual color-coded regions 900 and 902. For example, regions 900 may represent regions within real-world environment 202 wherein a temperature is, for example only, equal to or greater than 65° Celsius. Furthermore, regions 902 may represent regions within real-world environment 202 wherein a temperature is, for example only, less than 65° Celsius. It should be noted that temperatures within real-world environment 202 may be further virtually displayed by shades of colors. For example, a darker shade of blue displayed in augmented virtuality environment 310 may represent a region within real-world environment 202 having a temperature that is colder than a region within real-world environment 202 represented by lighter shade blue. Similarly, a darker shade of red displayed in augmented virtuality environment 310 may represent a region within real-world environment 202 having a temperature is warmer than a region within real-world environment 202 represented by a lighter shade of red. As another example, in an embodiment wherein sensor 206 comprises a laser or a sonar device, sensor 206 may be configured to sense the existence of a real-world object (e.g., a barrel, a vehicle, or a wall) within real-world environment 202. Accordingly, in this embodiment, operator control interface 302 may be configured to display a virtual object (i.e., a virtual barrel, a virtual vehicle, or virtual wall) at an associated position within augmented virtuality environment 310 to represent the existence of the real-world object within real-world environment 202.

Furthermore, as practiced by conventional augmented virtuality systems, each asset 204 (i.e., an unmanned ground vehicle (UGV) or an unmanned surface vehicle (USV)) may be configured to generate a local map of its surrounding environment as it navigates through real-world environment 202. As such, operator control interface 302 may be configured to virtually display an asset's local map 610 (see FIG. 8) in augmented virtuality environment 310.

It should be noted that operator control interface 302 may be configured to provide virtual representations of sensor data in augmented virtuality environment 310 so as to abstract an operator from details of the sensor data. For example, in the embodiment described above wherein sensor 206 comprises a laser, sensor 206 may be configured to measure a numerical distance from an associated asset 204 to a detected object within real-world environment 202. In addition to or in place of displaying the measured numerical distance reading, operator control interface 302 may be configured to, as mentioned above, display a virtual object at a corresponding position in the augmented virtuality environment 310 to represent the detected object located in real-world environment 202. As a result, an operator may not be required to interpret the numerical readings and can quickly visualize virtual representations of objects in augmented virtuality environment 310 that exist within real-world environment 202.

Figure 7:
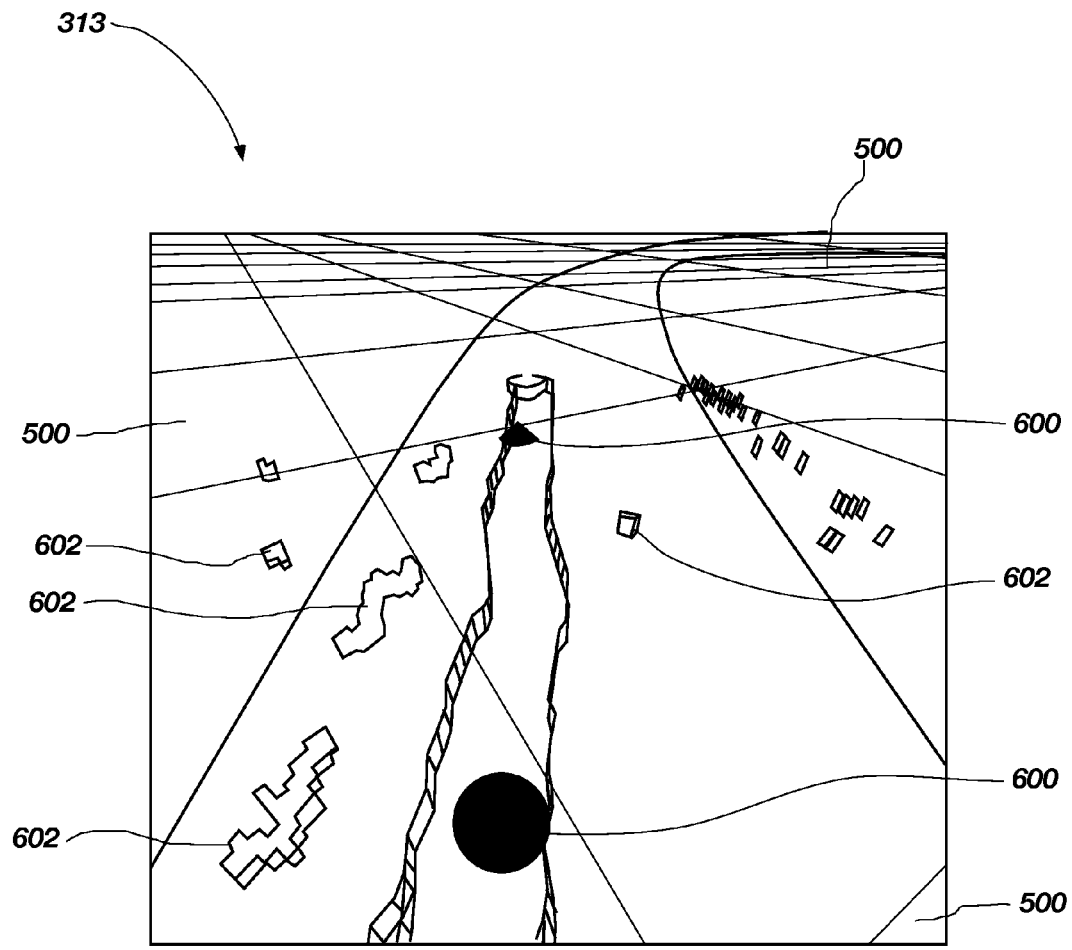
FIG. 7 illustrates a black and white rendering of a screenshot of at least a portion of an operating picture including real-world imagery and virtual color-coded regions, in accordance with an embodiment of the present invention.

As another example, instead of or in addition to displaying numerical chemical readings generated by a counter-mine sensor or an explosive sensor, operator control interface 302 may be configured to illustrate the numeric readings virtually in a color-coded manner with one or more colors placed in an appropriated position in augmented virtuality environment 310. For example, the color red may signify a "dangerous" region, the color yellow may signify a "caution" region and the color green may signify a "safe" region. FIG. 7 illustrates a black and white rendering of a screenshot 313 of at least a portion of operating picture 306 including real-world imagery 500 and virtual color-coded regions 600 and 602. For example, regions 600 may represent dangerous regions wherein mines were sensed by one or more counter-mine sensors. Furthermore, regions 602 may represent caution regions wherein explosive materials were sensed by one or more explosive sensors. As a consequence, an operator may not be required to interpret numerical readings and can quickly visualize and interpret safe and unsafe areas within real-world environment 202.

Upon receipt of sensor data, operator control interface 302 may be configured to fuse the sensor data into augmented virtuality environment 310 and display imagery (e.g., video and/or a still image) and virtual representations of sensor data in operating picture 310 to provide a holistic representation of the sensor data, assets 204, and any other objects positioned within real-world environment 202. Operator control interface 302 is configured to display data gathered from sensor 206 within operating picture 306 as it spatially relates to other data and each asset 204 within real-world environment 202.

Figure 10:
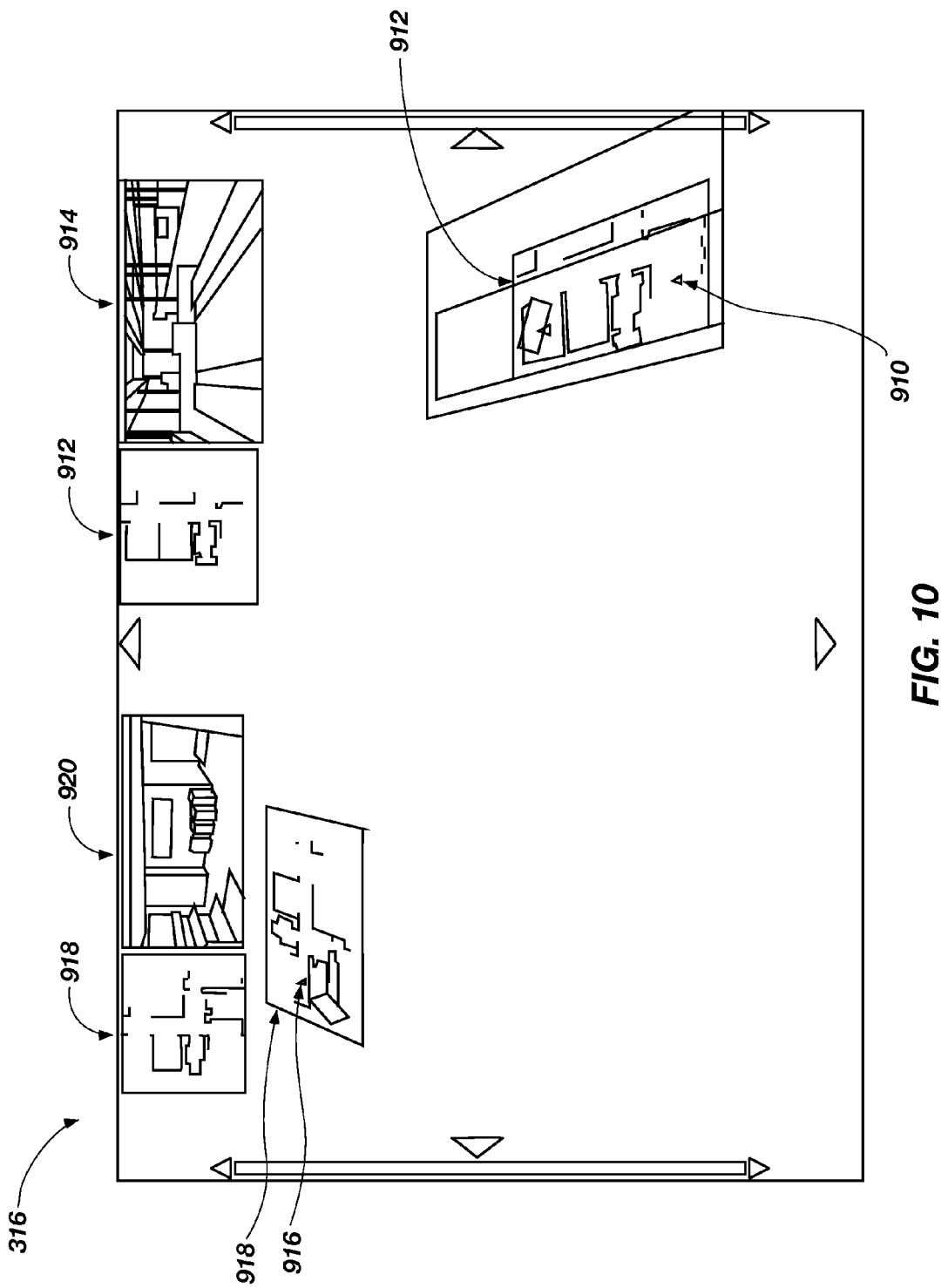
FIG. 10 illustrates a screenshot of at least a portion of an operating picture including virtual representations of a plurality of assets positioned within a real-world environment and sensor data sensed by each of the plurality of assets.
Figure 11:
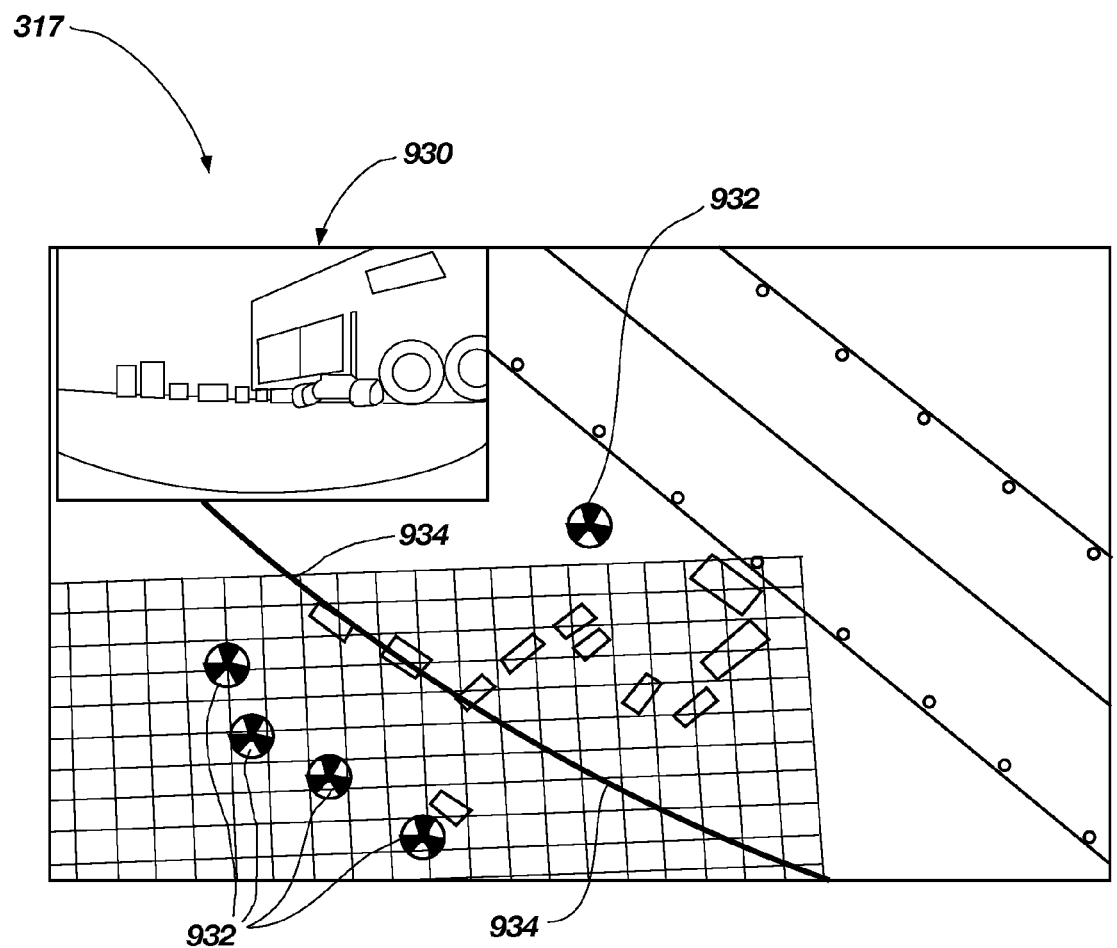
FIG. 11 illustrates a screenshot of at least a portion of an operating picture including sensor data sensed by a plurality of assets.

As a more specific example, operator control interface 302 may be configured to receive sensor data from a plurality of sensors within real-world environment 202. The sensor data may include a temperature reading from a thermal sensor, a chemical reading from a chemical sensor, and live video from an image sensor coupled to an airborne asset. Upon receipt of the sensor data, operator control interface 302 may be configured to substantially simultaneously display the live video in operating picture 306. Additionally, operator control interface 302 may be configured to substantially simultaneously fuse the chemical and temperature readings into augmented virtuality environment 310 and display virtual representations of the chemical and temperature readings at appropriate locations within common operating picture 306. As a result, operator control interface 302 may be configured to display a holistic representation of real-world environment 202 in operating picture 306 by displaying real-world imagery (i.e., live video and/or still images) and virtual representations of any data (i.e., assets, sensor data, and/or geospatial data) within real-world environment 202 in a common operating picture (i.e., operating picture 306). Therefore, an operator may visualize the spatial relationships of any objects displayed in the real-world imagery and any displayed virtual data in operating picture 306. As an example only, with reference to FIG. 10 which illustrates a screenshot 316 of at least a portion of operating picture 306, an asset (depicted by virtual icon 910), along with maps 912 and live video 914 associated with the asset depicted by virtual icon 910, may be displayed in operating picture 306. Furthermore, another asset (depicted by virtual icon 916), along with maps 918 and live video 920 associated with the asset depicted by virtual icon 916, may also be displayed in operating picture 306. Moreover, with reference to FIG. 11 which illustrates a screenshot 317 of at least a portion of operating picture 306, live video 930 captured by a ground asset (not shown), virtual icons 932 representing hazardous areas within real-world environment 202 sensed by at least one or more other assets, and a path 934 of an airborne asset (not shown) may be displayed simultaneously in operating picture 306. Accordingly, an operator's situational awareness of real-world environment 202 may be increased, which may increase an operator's ability to plan and carry out a desired mission.

In accordance with an embodiment of the present invention, operator control interface 302 may be configured to provide an operator with various "views" of augmented virtuality environment 310 (e.g., an augmented virtuality view of the world, an augmented virtuality view of a specific town within real-world environment 202, an augmented virtuality view of a specific street within real-world environment 202, or an augmented virtuality view of a specific asset 204 within real-world environment 202). Operator control interface 302 may be configured to allow an operator to change views by using a "zoom in" operation or a "zoom out" operation, as would be understood by a person having ordinary skill in the art.

For explanatory purposes only, various contemplated "views" of augmented virtuality environment 310 that may be displayed in operating picture 306 will now be described. One contemplated view may encapsulate an entire operating space (e.g., a global view) displayed as augmented virtuality environment 310, showing satellite imagery along with virtual data (e.g., virtual icons) representing each asset 204 positioned within the real-world environment 202. Another contemplated view may include a more specific region having a subset of assets 204 (e.g., a specific town or a specific road) displayed as augmented virtuality environment 310. Yet another contemplated view may include a view of a specific asset 204, a specific building, a specific vehicle, or any other object within real-world environment 202. For example only, as an operator "zooms in" from a global view to a more specific region (e.g., a specific town), satellite imagery may be faded out and replaced with, for example, local aerial imagery obtained from an asset 204, such as an unmanned air vehicle. Additionally, in a view of a specific region or a specific asset 204, virtual data (e.g., virtual items representing geospatial data 220 and/or sensor data) may be displayed. Additionally, in a view of a specific asset, local aerial imagery may be faded out and replaced with, for example, the asset's local map, as mentioned above.

Figure 8:
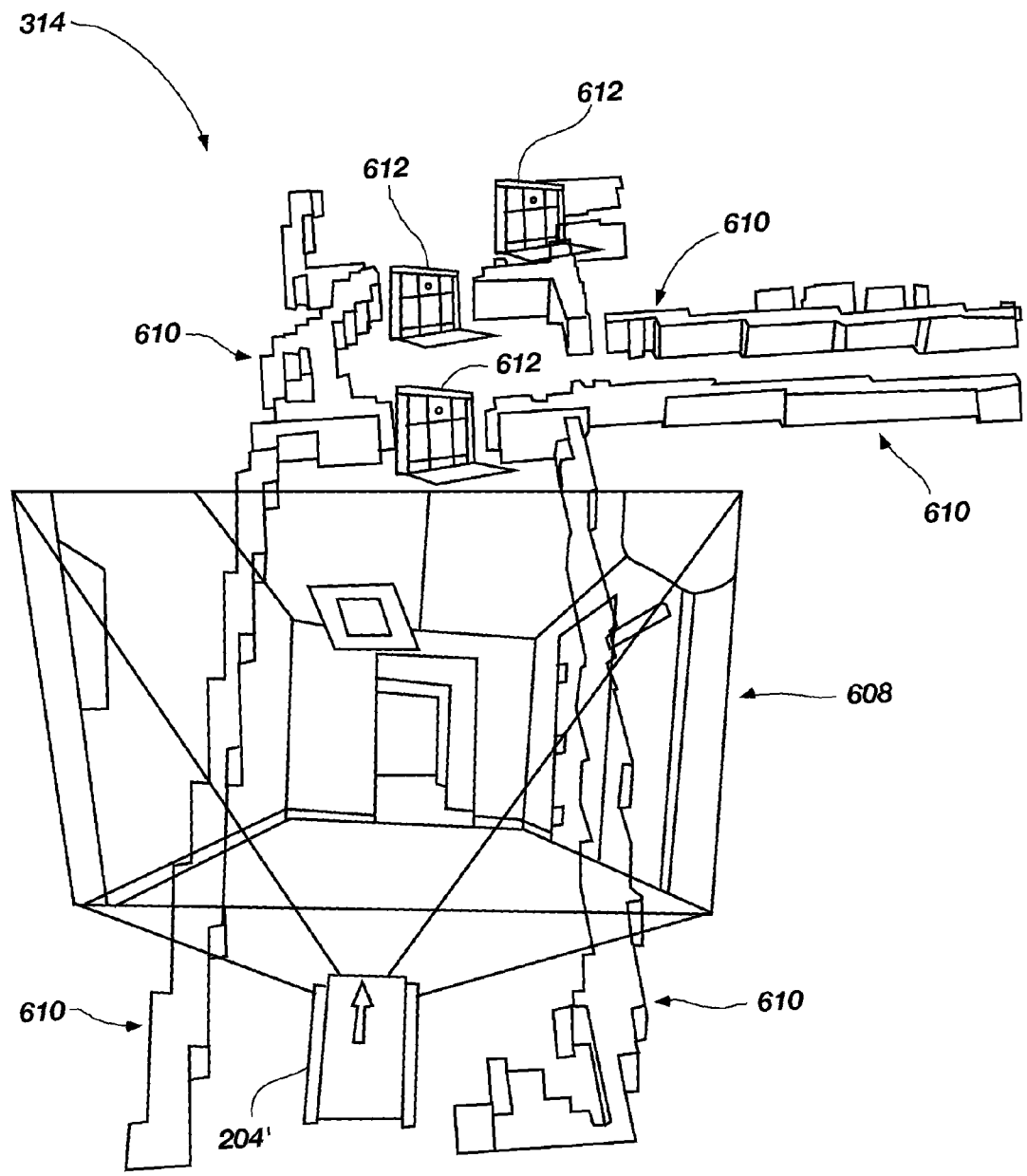
FIG. 8 illustrates a screenshot of at least a portion of an operating picture displayed upon selection of a particular asset for control, according to an embodiment of the present invention.

Moreover, when a particular asset 204 is selected to be controlled, a view from the perspective of the selected asset, including its local map as well as any virtual objects (e.g., virtual representation of the selected asset, geospatial data 220 and/or sensor data), may be displayed within augmented virtuality environment 310. FIG. 8 illustrates a screenshot 314 of at least a portion of operating picture 306 displayed upon selection of a particular asset for control. As illustrated in FIG. 8, a view 608 from the perspective of the selected asset, the selected asset's local map 610, and virtual objects (i.e., virtual asset 204' and virtual doors 612) are displayed.

In accordance with various embodiments of the present invention, operator control unit 303 may be configured to allow an operator to remotely control, via interaction with operator control interface 302, each asset 204 within real-world environment 202. More specifically, operator control unit 303 may be configured to provide an operator with control of an asset by interacting with an associated virtual icon within augmented virtuality environment 310. In an embodiment wherein display 122 comprises a touch screen device, as mentioned above, an operator may directly interact with operating picture 306 in order to control one or more assets 204 within real-world environment 202. In other embodiments, an operator may interact with peripheral I/O devices (e.g., a keyboard, a mouse, joystick, stylus, or any for device configured for communicating an operator command) in order to control one or more assets 204 within real-world environment 202. Upon receipt of an operator command, operator control interface may transmit one or more control signals to one or more assets within real-world environment 202. According to an embodiment of the present invention, and as described more fully below, operator control unit 303 may provide an operator with mixed-initiative control of one or more assets 204 and/or direct teleoperational control of a single asset 204.

Operator control unit 303 may be configured to enable adjustable levels of control of each asset 204. Stated another way, upon assigning a task to asset 204, an operator may take the initiative to control certain aspects of the task, while asset 204 may be given the initiative to control other aspects of the task. This feature may also be referred to as "mixed-initiative control." For example, if an operator has commanded an asset 204 to carry out a task, the operator may either control asset 204 entirely to carry out the task, asset 204 may control itself entirely in carrying out the task, or the operator and asset 204 may share in the control of asset 204 in carrying out the task. As a more specific example, operator control unit 303 may be configured to provide an operator with an ability to control a velocity of an asset 204, choose a destination point of an asset 204, and/or specify a task to be performed by an asset 204. Instead of controlling a velocity of asset 204, operator control unit 303 may be configured to abstract the operator from such details and allow the operator to simply choose a destination point of asset 204. Accordingly, asset 204 may take the initiative to control its velocity as it travels to the destination point. Similarly, rather than controlling a velocity of asset 204 or choosing a destination point of asset 204, the operator may simply specify a task to be carried out by asset 204. Accordingly, asset 204 may take the initiative to determine its velocity and its destination point in order to carry out the task. Adjusting a level of control given to an operator and an asset may leverage the strengths of both the operator and the asset.

Furthermore, at any time during operation of operator control interface 302, an operator may select a virtual icon in augmented virtuality environment 310 representing an asset 204 to directly teleoperate the selected asset 204. Upon selecting an asset 204 for direct teleoperation, the view of augmented virtuality environment 310 may become specific to the selected asset 204. Stated another way, when a particular asset 204 is selected for direct teleoperation, a view 608 (see FIG. 6) from the perspective of the selected asset 204 may be displayed in augmented virtuality environment 310.

As will be appreciated by a person of ordinary skill in the art, in an embodiment wherein asset 204 comprises a ground or surface vehicle, asset 204 may be configured to navigate within real-world environment 202 according to a generated path plan. More specifically, upon receiving a command from an operator to engage in a task or a mission (e.g., relocating from a current location to another location) asset 204 may receive and store a generated path plan to follow for navigating within real-world environment 202 in order to accomplish the mission or the task. As also will be appreciated by a person of ordinary skill in the art, the path plan may be generated from an external source (not shown) and based upon a priori geo-referenced data from an external database (e.g., a GIS database).

Furthermore, according to an embodiment of the present invention, asset 204 may be configured to perform reactive local navigation independent of any further input from an operator or an external source. Stated another way, each asset 204 may be configured to sense its surrounding environment and update its path plan in real-time as it navigates through real-world environment 202. For example, a ground asset 204 may sense changes within real-world environment 202 (e.g., moving obstacles or moving people) and adapt its path plan in light of any changes in order to avoid any obstructions or collisions while navigating within real-world environment 202. Additionally, it should be noted that it is not required that asset 204 receive an externally generated path plan in order to perform reactive local navigation. As such, asset 204 may be configured to sense its surrounding environment and generate a path plan in real-time as it navigates through real-world environment 202.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A method of operating an augmented virtuality system, comprising:
   displaying imagery of a real-world environment in an operating picture by:
      displaying substantially static still base imagery, developed from real-world base imagery data as part of the operating picture;
      acquiring dynamic real-time imagery depicting a selected region of the substantially static still base imagery;
      displaying the dynamic real-time imagery to substantially coincide with the selected region as it appears on the operating picture;
   displaying a plurality of virtual icons in the operating picture representing at least some assets of a plurality of assets positioned in the real-world environment; and
   displaying at least one virtual item in the operating picture representing data sensed by one or more assets of the plurality of assets at a position in the operating picture where the data was sensed; and
   navigating at least one asset of the plurality of assets positioned within the real-world environment, the navigating comprising:
      remotely controlling the at least one asset of the plurality of assets by interacting with a virtual icon in the operating picture associated with the at least one asset; and
      generating and updating a path plan in substantially real-time for the at least one asset of the plurality of assets as it moves in the real-world environment.

2. The method of claim 1, wherein remotely controlling at least one asset of the plurality of assets comprises teleoperating a single asset of the plurality of assets.

3. The method of claim 2, wherein teleoperating a single asset of the plurality of assets further comprises displaying a view from a perspective of the single asset.

4. The method of claim 1, wherein displaying at least one virtual item in the operating picture representing data sensed by one or more assets of the plurality of assets comprises displaying at least one of a color, alphanumeric text, and a three-dimensional virtual object representing the data sensed by one or more assets of the plurality of assets.

5. The method of claim 1, wherein the dynamic live video imagery is captured by one or more assets of the plurality of assets.

6. The method of claim 1, wherein remotely controlling at least one asset of the plurality of assets comprises sending at least one control signal to the at least one asset of the plurality of assets over a wireless communication medium.

7. The method of claim 6, further comprising adjusting a level of control allocated to the at least one asset of the plurality of assets in carrying out a task.

8. The method of claim 1, wherein displaying at least one virtual item in the operating picture representing data sensed by one or more of the assets of the plurality of assets comprises displaying at least one virtual item representing data sensed by one or more sensors operably coupled to the at least one or more assets of the plurality of assets.

9. The method of claim 8, wherein displaying at least one virtual item in the operating picture representing data sensed by one or more sensors comprises displaying at
   least one virtual item representing data sensed by at least one of one or more image sensors, one
   or more tracking sensors, one or more range sensors, one or more temperature sensors, one or more radiation sensors, one or more smoke detectors, one or more gas sensors, one or more wind sensors, one or more pressure sensors, one or more humidity sensors, one or more infrared sensors, one or more counter-mine sensors, one or more explosive sensors, one or more position sensors, one or more lasers, and one or more sonar devices.

10. The method of claim 1, further comprising capturing sensor data with one or more sensors operably coupled to the at least one or more assets of the plurality of assets.

11. The method of claim 10, further comprising transmitting the captured sensor data to at least one remote computer.

12. The method of claim 10, further comprising storing the captured sensor data in at least one computer communicatively coupled to the at least one or more assets of the plurality of assets.

13. The method of claim 1, further comprising capturing sensor data with at least one or more assets of the plurality of assets and substantially simultaneously displaying one or more virtual items in the operating picture representing the sensor data captured by the at least one or more assets of the plurality of assets.

14. A method of operating an augmented virtuality system, comprising:
- displaying imagery of a real-world environment in an operating picture by:
  - displaying substantially static still base imagery developed from real-world base imagery data as part of the operating picture;
  - acquiring dynamic real-time imagery depicting a selected region of the substantially static still base imagery;
  - displaying the dynamic real-time imagery to substantially coincide with the selected region as it appears on the operating picture; and
  - displaying virtual data in the operating picture, wherein at least some of the virtual data represents a plurality of assets positioned in the real-world environment and at least some of the virtual data represents data sensed by one or more assets of the plurality of assets at a position in the operating picture where the data was sensed; and
- navigating at least one asset of the plurality of assets positioned within the real-world environment, the navigating comprising:
  - remotely controlling the at least one asset of the plurality of assets by interacting with a virtual icon in the operating picture associated with the at least one asset; and
  - generating and updating a path plan in substantially real-time for the at least one asset of the plurality of assets as it moves in the real-world environment.

15. The method of claim 14, wherein displaying virtual data in the operating picture comprises displaying at least one virtual item representing sensor data captured by one or more of the assets of the plurality of assets.

16. The method of claim 15, wherein displaying at least one virtual item representing sensor data comprises displaying at least one of a three-dimensional virtual object, alphanumeric text, a three-dimensional virtual icon, a video, and aerial imagery in the operating picture representing sensor data gathered from at least one asset of the plurality of assets.

17. The method of claim 14, wherein displaying virtual data in the operating picture comprises displaying at least one color in the operating picture representing sensor data gathered from at least one asset of the plurality of assets.

18. The method of claim 14, further comprising capturing sensor data with at least one or more assets of the plurality of assets and substantially simultaneously displaying
virtual representations of the sensor data captured by the at least one or more assets of the plurality of assets.

19. The method of claim 14, wherein displaying virtual data in the operating picture comprises displaying at least one virtual object overlaying the imagery and at a location based on a predefined geospatial position of the at least one virtual object.

20. The method of claim 14, wherein the substantially static still base imagery is obtained from a satellite positioned within the real-world environment.

21. The method of claim 14, wherein displaying imagery of the real-world environment comprises displaying at least one of a live video and at least one still image obtained from at least one sensor coupled to at least one asset of the plurality of assets positioned with the real-world environment.

22. The method of claim 14, wherein displaying virtual data in the operating picture comprises displaying a plurality of virtual icons representing at least one of one or more unmanned ground vehicles, one or more unmanned surface vehicles, one or more unmanned air vehicles, one or more unattended ground sensors, and one or more personnel positioned within the real-world environment.

23. The method of claim 14, wherein navigating at least one asset of the plurality of assets comprises remotely controlling at least one asset of the plurality of assets positioned within the real-world environment by interacting with the operating picture.

24. The method of claim 23, wherein remotely controlling at least one asset of the plurality of assets comprises remotely controlling at least one asset of the plurality of assets by interacting with a touch screen display device displaying the operating picture.

25. The method of claim 23, wherein remotely controlling at least one asset of the plurality of assets comprises directly controlling a single asset by teleoperation.

26. The method of claim 14, wherein navigating at least one asset of the plurality of assets further comprises generating a path plan in real-time with the at least one asset of the plurality of assets as the at least one asset of the plurality of assets navigates through the real-world environment.

27. An augmented virtuality system, comprising:
- a plurality of assets positioned within a real-world environment;
- at least one computer communicatively coupled to each asset of the plurality of assets and including a processor and a non-transitory computer-readable medium coupled to the processor;
- a display device operably coupled to the at least one computer; and
- an application program stored in the non-transitory computer-readable medium, the application program, when executed by the processor, configured to:
  - displaying imagery of a real-world environment in an operating picture by:
    - displaying substantially static still base imagery developed from real-world base imagery data as part of the operating picture;
    - acquiring dynamic real-time image depicting a selected region of the substantially static still base imagery;
    - displaying the dynamic real-time imagery to substantially coincide with the selected region as it appears on the operating picture; and
    - displaying virtual data overlaying imagery of the real-world environment displayed, wherein at least some of the virtual data represents data sensed by at least one asset of the plurality of assets at a position in the operating picture where the data was sensed; and
  - navigating at least one asset of the plurality of assets positioned within the real-world environment, the navigating comprising:
    - remotely controlling the at least one asset of the plurality of assets by interacting with a virtual icon in the operating picture associated with the at least one asset; and
    - generating and updating a path plan in substantially real-time for the at least one asset of the plurality of assets as it moves in the real-world environment.

28. The augmented virtuality system of claim 27, wherein the display device comprises one of a video wall, a three-dimensional video table, a holographic video display, and a monitor.

29. The augmented virtuality system of claim 27, wherein the display device comprises a touch-screen device.

30. A non-transitory computer-readable media storage medium storing instructions that when executed by a processor cause the processor to perform instructions for operating an augmented virtuality system, the instructions comprising:
displaying imagery of a real-world environment in an operating picture by:
displaying substantially static still base imagery developed from real-world base imagery data as part of the operating picture;
acquiring dynamic real-time imagery depicting a selected region of the substantially static still base imagery;
displaying the dynamic real-time imagery to substantially coincide with the selected region as it appears on the operating picture; and
displaying a plurality of virtual items in the operating picture overlaying the imagery, wherein at least one virtual item represents an asset of a plurality of assets positioned in the real-world environment, wherein at least one other virtual item represents sensor data captured by one or more assets of the plurality of assets and presented at a position in the operating picture where the sensor data was captured; and
navigating at least one asset of the plurality of assets positioned within the real-world environment, the navigating comprising:
remotely controlling the at least one asset of the plurality of assets by interacting with a virtual icon in the operating picture associated with the at least one asset; and
generating and updating a path plan in substantially real-time for the at least one asset of the plurality of assets as it moves in the real-world environment.

31. The non-transitory computer-readable media storage medium of claim 30, wherein displaying a plurality of virtual items in the operating picture comprises displaying at least one of a three-dimensional virtual object, a three-dimensional virtual icon, imagery, an image, and alphanumeric text in the operating picture.

32. A method of generating an augmented virtuality environment, comprising:
displaying imagery of a real-world environment in an operating picture by:
displaying substantially static still base imagery developed from real-world base imagery data as part of the operating picture;
acquiring dynamic real-time imagery depicting a selected region of the substantially static still base imagery;
displaying the dynamic real-time imagery to substantially coincide with the selected region as it appears on the operating picture;
displaying at least one virtual icon in the operating picture representing an asset of a plurality of assets positioned in the real-world environment; and
displaying virtual data in the operating picture representing data sensed by at least two assets of the plurality of assets at a position in the operating picture where the data was sensed; and
navigating at least one asset of the plurality of assets positioned within the real-world environment, the navigating comprising:
remotely controlling the at least one asset of the plurality of assets by interacting with a virtual icon in the operating picture associated with the at least one asset; and
generating and updating a path plan in substantially real-time for the at least one asset of the plurality of assets as it moves in the real-world environment.

33. The method of claim 32, wherein displaying real-world imagery comprises: displaying at least one of satellite imagery and local aerial imagery as the substantially static still base imagery; and
displaying a live video captured by an asset of the plurality of assets and mapped over the substantially static still base imagery.

34. The method of claim 32, further comprising displaying at least one virtual object in the operating picture representing geospatial data received from a geospatial information system (GIS).

* * * * *

UNITED STATES PATENT AND TRADEMARK OFFICE
CERTIFICATE OF CORRECTION

| | |
|---|---|
| PATENT NO. | : 8,732,592 B2 |
| APPLICATION NO. | : 12/480459 |
| DATED | : May 20, 2014 |
| INVENTOR(S) | : Curtis W. Nielsen et al. |

It is certified that error appears in the above-identified patent and that said Letters Patent is hereby corrected as shown below:

On the title page:
In ITEM (75) Inventors: change "Johnathon Whetten," to --Johnathan Whetten,--

Signed and Sealed this
Third Day of May, 2016

Michelle K. Lee
*Director of the United States Patent and Trademark Office*